United States Patent [19]

Burt

[11] 4,428,708
[45] Jan. 31, 1984

[54] APPARATUS AND METHOD FOR FINE POSITIONING A VEHICLE AT A STORAGE BIN IN AN AUTOMATIC STORAGE AND RETRIEVAL SYSTEM

[75] Inventor: Harold S. Burt, Kansas City, Kans.
[73] Assignee: Midwest Conveyor Co., Inc., Kansas City, Kans.
[21] Appl. No.: 221,792
[22] Filed: Dec. 31, 1980
[51] Int. Cl.³ .............................................. B65G 1/00
[52] U.S. Cl. ................................... 414/275; 364/444; 364/478
[58] Field of Search ............... 414/273, 275, 277, 279, 414/281, 282; 364/478, 444; 318/592, 594, 601, 602; 340/680, 686

[56] References Cited

U.S. PATENT DOCUMENTS

| | | |
|---|---|---|
| 3,049,247 | 8/1962 | Lemelson . |
| 3,119,501 | 1/1964 | Lemelson . |
| 3,132,753 | 5/1964 | Chasar et al. . |
| 3,232,455 | 2/1966 | Fountain et al. . |
| 3,285,437 | 11/1966 | Lemelson . |
| 3,387,723 | 6/1968 | Lemelson . |
| 3,402,835 | 9/1968 | Saul . |
| 3,402,836 | 9/1968 | Derey et al. ......................... 414/273 |
| 3,455,468 | 7/1969 | Saul . |
| 3,463,566 | 8/1969 | Powers . |
| 3,478,254 | 11/1969 | Lofrisco et al. . |
| 3,486,092 | 12/1969 | Macko . |
| 3,486,640 | 12/1969 | Lemelson . |
| 3,504,245 | 3/1970 | Cotton et al. . |
| 3,513,993 | 5/1970 | Lemelson . |
| 3,516,557 | 6/1970 | Kaplan ................................ 414/273 |
| 3,519,151 | 7/1970 | Lemelson . |
| 3,531,705 | 9/1970 | Rosin et al. . |
| 3,557,974 | 1/1971 | Ostrander . |
| 3,572,484 | 3/1971 | Richins ........................... 414/273 X |
| 3,581,915 | 6/1971 | Saul . |
| 3,593,863 | 7/1971 | Kintner .............................. 414/273 |
| 3,638,575 | 2/1972 | Griner ............................ 414/273 X |
| 3,646,890 | 3/1972 | Snyder ........................... 364/478 X |
| 3,708,077 | 1/1973 | Richens et al. ..................... 414/279 |
| 3,725,867 | 4/1973 | Jordan . |
| 3,734,310 | 5/1973 | Miller ................................ 414/273 |
| 3,737,056 | 6/1973 | Hathcock, Jr. ..................... 414/273 |
| 3,746,189 | 7/1973 | Burch et al. . |
| 3,782,565 | 1/1974 | Doran et al. .................... 414/277 X |
| 3,786,929 | 1/1974 | Hathcock, Jr. ..................... 414/273 |
| 3,790,005 | 2/1974 | Smith . |
| 3,799,057 | 3/1974 | Cassel . |
| 3,803,561 | 4/1974 | Yucius . |
| 3,815,084 | 6/1974 | Pease . |
| 3,824,020 | 7/1974 | Pease . |
| 3,850,105 | 11/1974 | Aronstein et al. . |
| 3,873,902 | 3/1975 | Burch ................................. 318/594 |
| 3,880,307 | 4/1975 | Peterson . |
| 3,889,169 | 6/1975 | Hirschman et al. . |
| 3,927,773 | 12/1975 | Bright ................................ 414/273 |
| 3,973,685 | 8/1976 | Loomer . |
| 4,176,996 | 12/1979 | Oku . |
| 4,195,347 | 3/1980 | MacMunn et al. ............. 414/273 X |
| 4,221,998 | 9/1980 | Haught et al. .................. 318/594 X |
| 4,331,417 | 5/1982 | Shearer, Jr. ......................... 414/273 |

OTHER PUBLICATIONS

"Digital Position Measurement", Wiles, Sep. 1970, *Instruments and Control Systems*, pp. 129-131.

Primary Examiner—Robert B. Reeves
Assistant Examiner—Edward M. Wacyra
Attorney, Agent, or Firm—Litman, Day & McMahon

[57] ABSTRACT

An automatic storage and retrieval system including a storage bin, having a mechanism for positioning a vehicle at the storage bin including a rough positioning mechanism with an encoder having a rotatable member which rotates through an arc less than a complete revolution in response to movement of the vehicle and generates a signal with a different value at each of various member positions which correspond to respective vehicle rough position zones. A control device receives the signal and selectively causes the vehicle to move to a rough position zone at the storage bin. A fine positioning mechanism repositions the vehicle within a particular position zone after rough positioning and utilizes a light source and photoelectric sensor mounted on the vehicle for detecting a target mounted in a fixed relation with respect to the storage bin. The control mechanism receives an electrical signal generated by the photoelectric sensor and causes the vehicle to stop at the fine position location at the storage bin. A high-low positioning device selectively lowers and raises a carriage including a retrieval apparatus such as a fork assembly within the bin. A method is provided to utilize the automatic storage and retrieval system including rough and fine positioning of a vehicle relative to a storage bin and high-low positioning within the bin.

9 Claims, 11 Drawing Figures

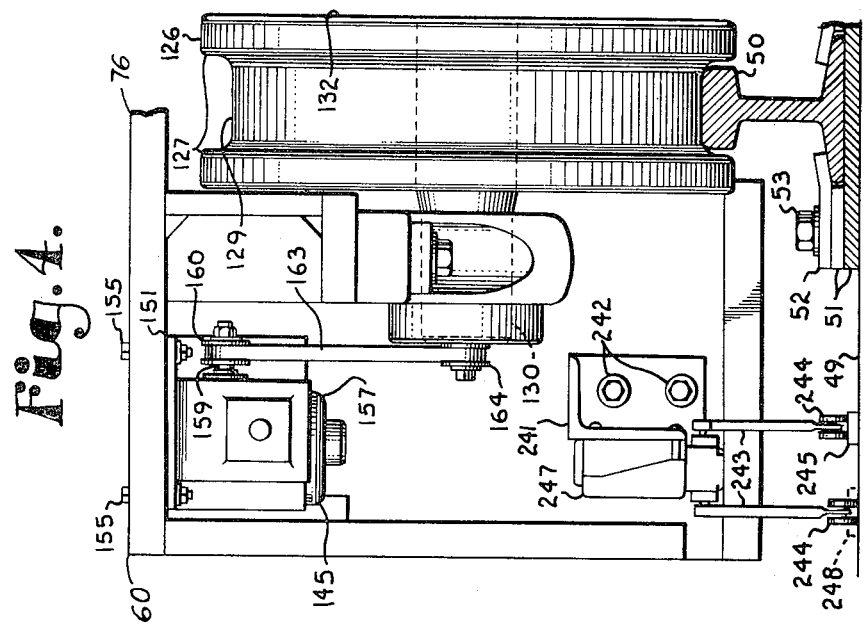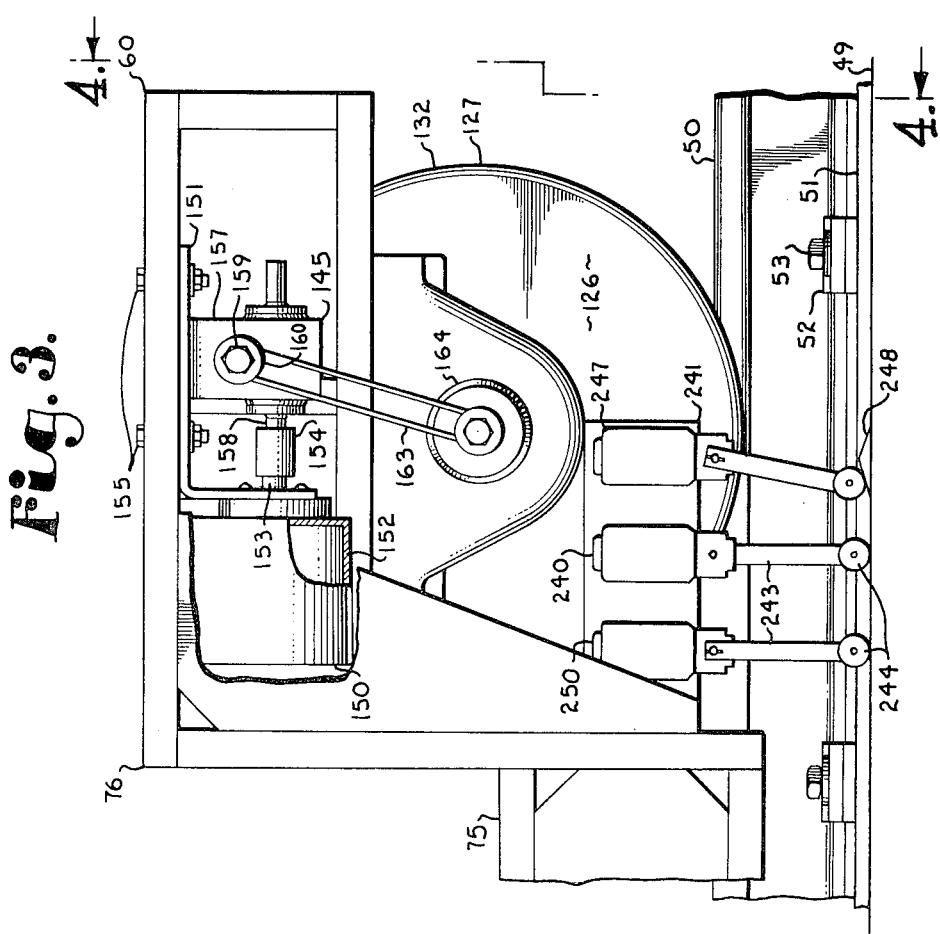

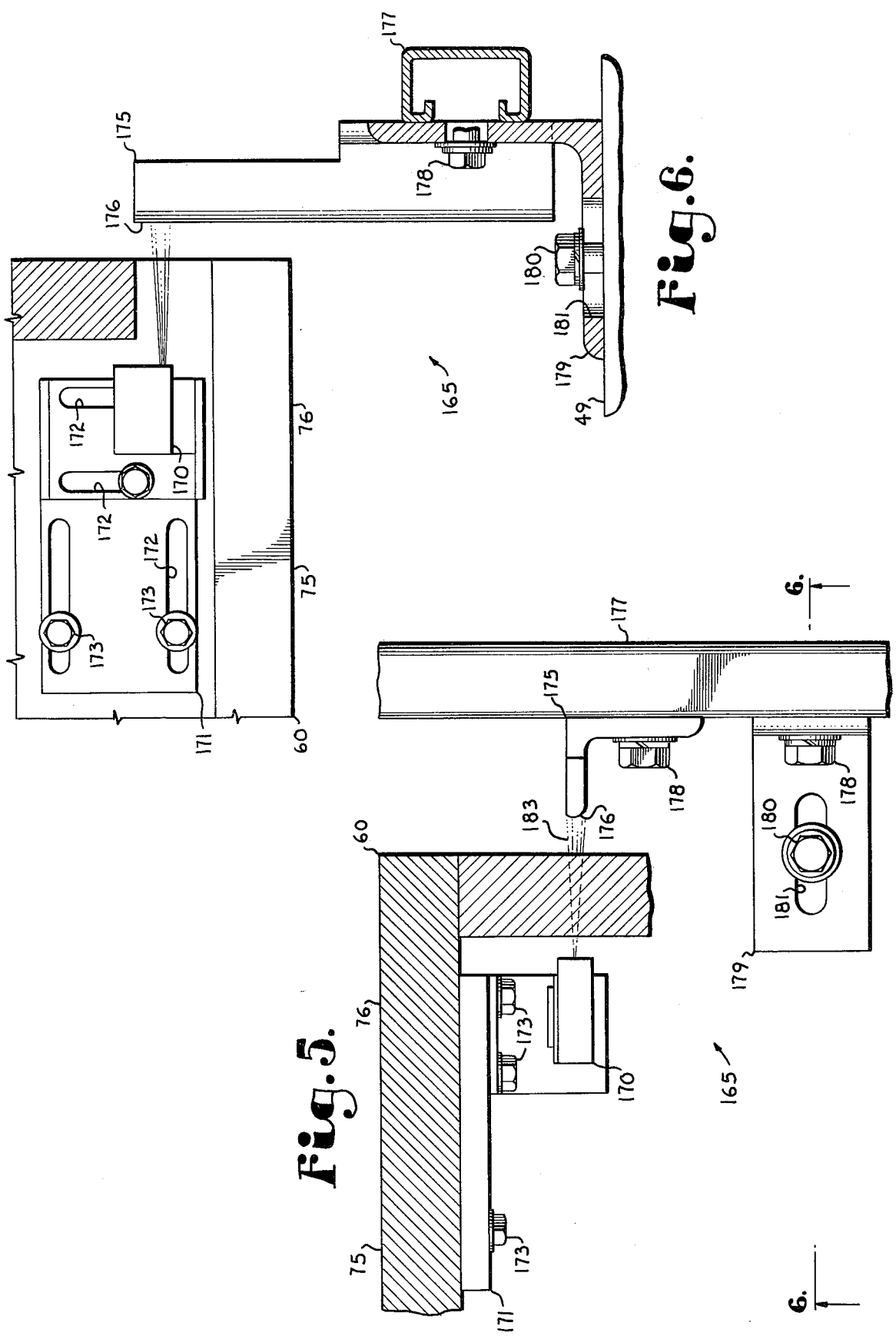

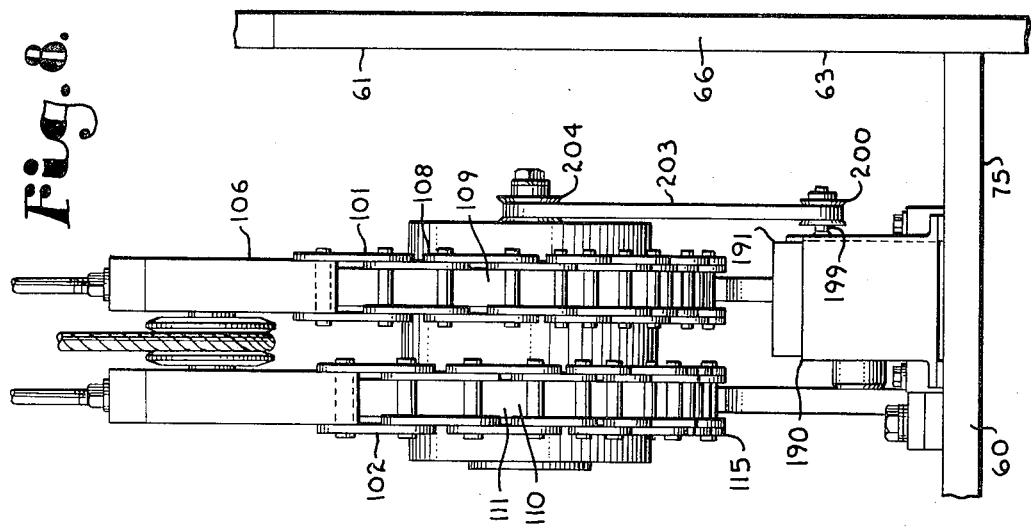

APPARATUS AND METHOD FOR FINE POSITIONING A VEHICLE AT A STORAGE BIN IN AN AUTOMATIC STORAGE AND RETRIEVAL SYSTEM

CROSS-REFERENCE TO RELATED APPLICATION

The present application is directed to an Apparatus and Method for Fine Positioning a Vehicle at a Storage Bin in an Automatic Storage and Retrieval System adapted for utilization with an apparatus and method which is the subject matter of a copending Patent application entitled Apparatus and Method for Rough Positioning a Vehicle at a Storage Bin in an Automatic Storage and Retrieval System, U.S. application Ser. No. 221,791, filed Dec. 31, 1980 now U.S. Pat. No. 4,415,975.

BACKGROUND OF THE INVENTION

This invention relates to positioning systems for vehicles, and in particular, to a system for positioning a vehicle at a storage bin for automatic storage and retrieval.

Automatic storage and retrieval systems are utilized in warehousing to provide maximum efficiency and economy of operation for material handling. An increasing trend toward automation of materials handling functions in warehouses has occured in conjunction with the use of larger storage racks. Such storage racks may, for example, be constructed to heights of 85 feet or more and of virtually unlimited length. A principal advantage to constructing such storage racks to greater heights is that the building floor area required to store an equivalent amount of material is thereby reduced in comparison to a system of lesser height.

Vehicles are used in such warehouses for moving material loads therein, for example in storage operations for movement from pickup stations to designated storage bins and in retrieval operations for movement from storage bins to pickup stations. The positioning mechanisms for guiding such vehicle movements must be capable of consistently and accurately positioning a vehicle within a sufficiently precise location at a storage bin for performing a storage or retrieval operation of a material load in a minimum amount of time.

Such positioning mechanisms are also preferably capable of receiving a command and thereby automatically causing a vehicle to perform desired operations at a designated storage bin and pickup or discharge station. Such a command, for example, might direct a vehicle to move to a predetermined storage bin, retrieve a material load therefrom, move to a discharge station or another predetermined storage bin, and discharge the load thereat. Thus, with such an automatically controlled warehouse, an operator can store and retrieve material merely by inputting the proper command, for example, by means of a keyboard or card data system.

A further advantage of automatic storage and retrieval systems is that, because an operator is not required on each vehicle, the environment within which the storage rack is positioned need not be controlled for the safety and comfort of an operator. Thus, for example, refrigerated good may be stored at low temperatures with the operator positioned outside the freezer or cooler. Also, a relatively low cost, unheated and uncooled warehouse type structure may be provided for the storage rack with the operator remotely positioned therefrom in a more controlled environment.

To achieve such automated operation, a positioning mechanism is required to accurately place a vehicle in a predetermined location with respect to a designated storage bin. A variety of such mechanisms have been developed for use in such automatic storage and retrieval systems. A number of such heretofore conventional positioning mechanisms utilize a counter associated with various controls for stopping vehicle travel upon receiving a predetermined number of signals or impulses from the counter. For example, the Lemelson U.S. Pat. No. 3,285,437 shows a switch attached to a carrier or vehicle and tripped by engaging pins, cut-outs or dogs along an overhead track, each corresponding to a column of storage bins. However, such mechanical tripping devices are susceptible to damage which may result in counter error and the vehicle attempting to deposit or retrieve a load at the wrong storage bin. Such attempts can result in collisions between material loads on the vehicle and material loads already positioned at the mistakenly selected bin with resultant damage to each.

A different method of actuating a counter is shown in the Lemelson U.S. Pat. No. 3,486,640 which utilizes reflectors attached to a storage frame. Light sources and photoelectric scanners are provided on a carrier for detecting the reflectors and actuating the counter to determine when a required distance has been traversed. Such photoelectric systems are also susceptible to misdirecting a carrier if, for example, a reflector is so dulled that the passing sensor is not actuated or if the sensor is mistakenly actuated by other reflective material adjacent its path such as a reflective portion of a material load. A further example of a tripping mechanism connected to a counter is disclosed in the Saul U.S. Pat. No. 3,402,835 and includes a magnetic proximity switch connected to the carrier and actuated by metallic posts positioned adjacent respective columns of storage bins. However, each of the discussed prior art positioning mechanisms which utilize counters responding to individual rows or columns of storage bins are susceptible to miscalculating the position of a vehicle or carrier and thereby causing damage as described above.

In addition to their susceptibility to positioning errors, counting systems typically utilize stepping relays which must be individually pulsed to the number of a designated storage bin. Thus, the required circuitry tends to be especially complex for storage systems having relatively large numbers of bins.

Another type of positioning mechanism utilizing a counter is shown in the Richins U.S. Pat. No. 3,572,484 and the Cassel U.S. Pat. No. 3,799,057, both of which disclose an encoder driven by a wheel of a carriage and generating a predetermined number of electrical pulses for each rotation thereof. The pulses are then counted by stepping relays until a predetermined number have been received designating the carriage in a predetermined position. An inherent disadvantage with such positioning mechanisms is that the storage bins must be evenly spaced so that the dimensions of each represent the same number of carriage wheel revolutions. Thus, warehouses utilizing such a positioning mechanism are not especially suited for use with storage bin loads having different sizes. Also, the spacing of storage bins within most warehouses is interrupted with columns and other support structure which makes even spacing of the storage bins impractical.

The DeBrey U.S. Pat. No. 3,402,836 shows a positioning mechanism which attempts to avoid some of the difficulties inherent with such mechanisms using counting type systems. The storage bins shown therein each have a coded array of photoelectric targets which, when detected by photoelectric sensors, uniquely identify each storage bin. However, a storage rack having hundreds of individual storage bins, for example, would also require a like number of unique arrays of reflective markers and a complex system of photoelectric sensors for uniquely identifying each respective storage bin. Another non-counting type of positioning mechanism is shown in the Macko U.S. Pat. No. 3,486,092 which includes bridge network circuitry with a variable resistance leg and polarity sensitive means on the carrier responding to an imbalance of the bridge and initiating carrier movement in the proper direction. The carrier is properly positioned when the bridge balanced. Disadvantages of such a positioning mechanism include difficulties with varying the resistance sufficiently in a relatively long storage rack and the difficulty of positioning a carriage accurately enough for storage and retrieval operations which often have tolerances of fractions of an inch.

Therefore, prior art automatic warehouse positioning systems have tended to be susceptible to positioning errors, excessively complex in structure and circuitry, and not well adapted for use with relatively long storage racks.

The present invention comprises a positioning mechanism wherein rough positioning within a zone at a designated storage bin is accomplished with an encoder generating a signal the value of which varies in response to movement of the vehicle. Fine positioning of the vehicle is accomplished with signal generating means designating a predetermined location of the vehicle within each zone. Control means receives the signals and causes the vehicle to move to the zone and to stop at the predetermined location.

SUMMARY OF THE INVENTION

The principal objects of the present invention are: to provide a mechanism and method for positioning a vehicle at a storage bin in an automatic storage and retrieval system; to provide such a positioning mechanism which includes an encoder generating a signal having different values designating respective vehicle position zones; to provide such a positioning mechanism wherein said encoder has a member rotatable in response to movement of the vehicle; to provide such a positioning mechanism wherein the encoder member is rotatable in an arc less than a complete revolution; to provide such a positioning mechanism which is particularly well adapted for use with relatively long storage racks; to provide such a positioning mechanism which is particularly well adapted for positioning a vehicle at a relatively large number of storage bins; to provide such a positioning mechanism and method which are particularly well adapted for use with storage racks having storage bins of different sizes; to provide such a positioning mechanism which includes distance measuring means for rough positioning of a vehicle and photoelectric sensor means for fine positioning thereof; to provide such a positioning mechanism which includes horizontal and vertical encoders for rough positioning within horizontal and vertical zones; to provide such a positioning mechanism wherein a carriage is positioned vertically with respect to the vehicle by a vertical encoder and photoelectric sensor means; to provide such a positioning mechanism which includes reflective targets and respective photoelectric sensors for vertically positioning a carriage at high and low positions at a designated storage bin location; to provide such a positioning mechanism adapted for positioning a vehicle and a carriage mounted thereon with sufficient accuracy for effecting material load storage and retrieval operations; and to provide such a positioning mechanism which is economical to manufacture, efficient and accurate in use, capable of a long operating life, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged and fragmentary side elevational view of the vehicle particularly showing an encoder, a first reductor, an idler wheel, and reset, slowdown and stop switches.

FIG. 4 is an enlarged and fragmentary vertical cross-sectional view of the vehicle taken along line 4—4 in FIG. 3.

FIG. 5 is an enlarged and fragmentary top plan view of the vehicle particularly showing a reflective target, a light source and a photoelectric sensor.

FIG. 6 is an enlarged and fragmentary vertical cross-sectional view of the vehicle taken along line 6—6 in FIG. 5, particularly showing the target, the photoelectric light source and the sensor.

FIG. 7 is an enlarged and fragmentary vertical cross-sectional view of the vehicle taken along line 7—7 in FIG. 2 and particularly showing a carriage hoist mechanism, a second reductor and a vertical encoder.

FIG. 8 is an enlarged and fragmentary vertical cross-sectional view of the vehicle taken along line 8—8 in FIG. 7.

DESCRIPTION OF THE PREFERRED EMBODIMENTS

As required, detailed embodiments of the present invention are disclosed herein, however it is to be understood that the disclosed embodiments are merely exemplary of the invention which may be embodied in various forms. Therefore, specific structural and functional details described herein are not to be interpreted as limiting, but merely as a basis for the claims and as a representative basis for teaching one skilled in the art to variously employ the present invention in virtually any appropriately detailed structure.

Figure 1:
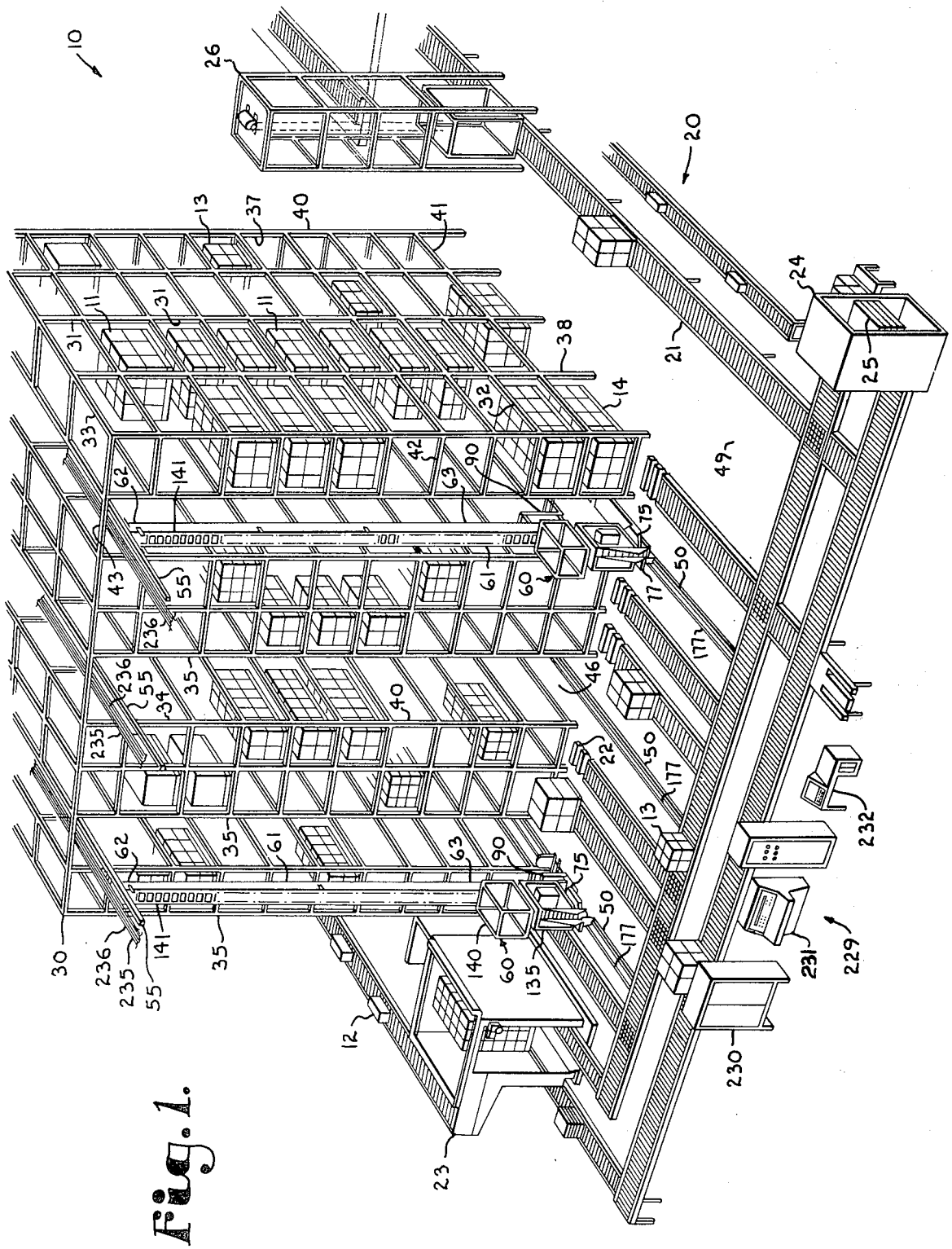
FIG. 1 is a perspective view of an automatic storage and retrieval system embodying the present invention.

For purposes of description herein, the terms "upper", "lower", "vertical" and "horizontal" and derivatives thereof shall relate to the invention in an automatic storage and retrieval system as oriented in FIG. 1. The terms "right" and "left" and derivatives thereof shall respectively relate to the near and far sides of the vehicle respectively, as oriented with respect to a viewer in FIG. 2. The terms "front" and "rear" and derivatives thereof shall respectively relate to the right and left sides of the vehicle as oriented with respect to a viewer, in FIG. 2. However, it is to be understood that the invention may assume various alternative orientations, except where expressly specified to the contrary.

Referring more in detail to the drawings, the reference numeral 10 generally designates an automatic storage and retrieval system for warehousing material load units 11 which may comprise, for example, a plurality of palletized cases 12 containing materials or products. Such material load units 11 may also comprise single items or a plurality of items otherwise suitably grouped or contained. In addition to the normal size material load unit 11, small material load units 13 and large material load units 14 may also be handled by the present invention.

Such an automatic storage and retrieval system 10 may be positioned adjacent to, for example, a manufacturing facility (not shown) for warehousing either parts and subassemblies used in the manufacturing process or finished products thereof or both.

I. INPUT AND OUTPUT SYSTEM

Material load units 11 and cases 12 are brought into the automatic storage and retrieval system 10 and prepared for storage and retrieval functions therein by an input and output system 20 (FIG. 1). Movement of material load units 11 between various stations of the input and output system 20 is accomplished by means of a multilevel horizontal conveyor 21. A palletizer 23 receives cases 12 and converts them to material load units 11 for more convenient handling and storage. A pallet stacker and dispenser 24 returns empty pallets 25 to the palletizer 23 by means of horizontal conveyor 21 for further use. A vertical conveyor 26 moves material load units 11 between respective levels of the horizontal conveyor 21. For storing operations, material load units 11 are positioned by horizontal conveyor 21 at pickup and delivery stations 22. Pickup and delivery stations 22 also receive loads being retrieved from the automatic storage and retrieval system 10 for transfer to horizontal conveyor 21.

II. STORAGE RACK

Storage racks 30 are adapted for supporting material load units 11 thereon and are arranged in opposed pairs of rack sections 35 each positioned on one side of an aisle space 46. Each rack section 35 includes a plurality of storage bins 31 arranged in vertical columns 33 and horizontal rows 32. In addition to storage bins 31, small and large storage bins 37 and 38 respectively are also provided for receiving small and large material load units 13 and 14 respectively. Rack sections 35 each comprise a grid-like interconnected framework of uprights 40 with longitudinal bracing 41 and lateral ladder frame bracing 42 connected thereto. Respective rack sections 35 are connected by top cross-ties 43.

Figures 1A, 2:
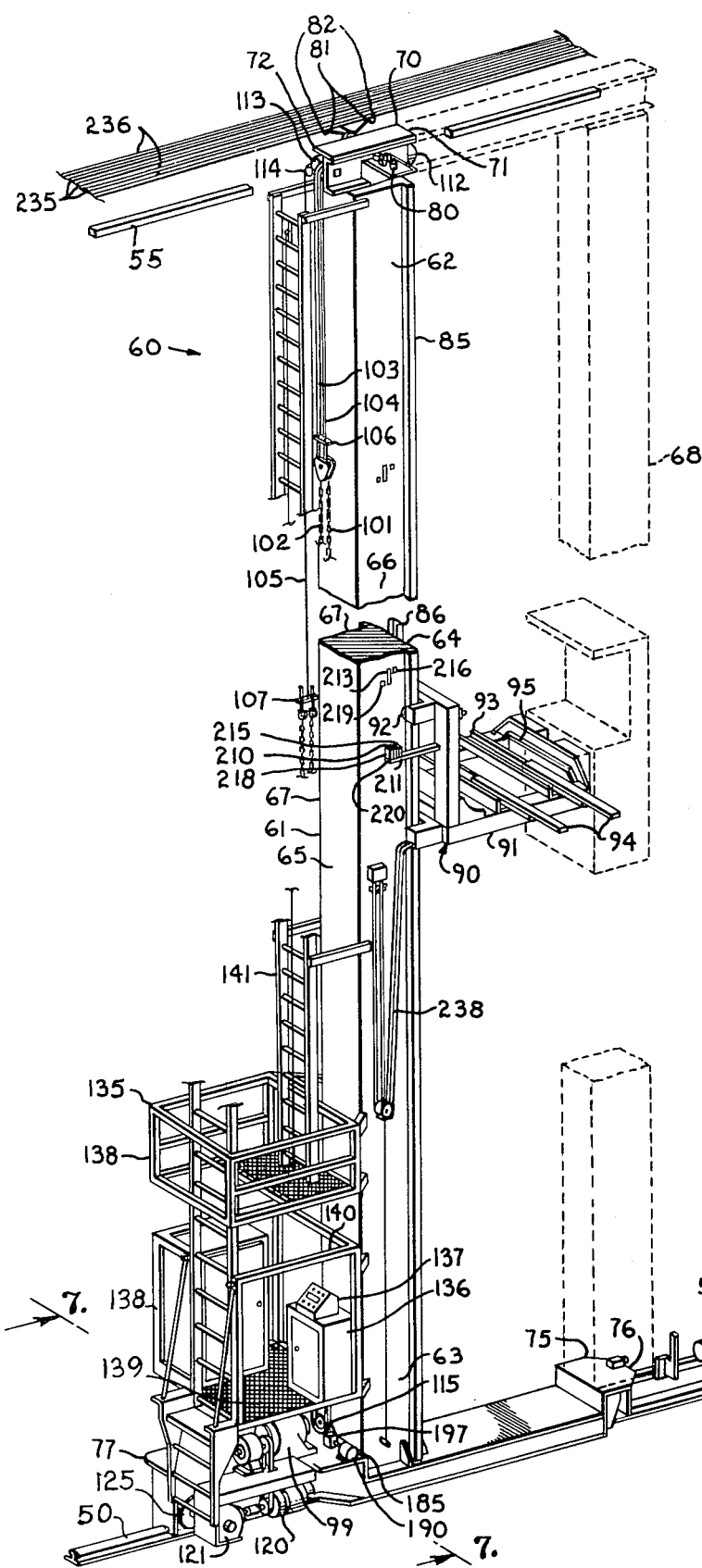
FIG. 1a is an enlarged, fragmentary front elevational view of a storage bin particularly showing a pair of load support members.
FIG. 2 is an enlarged and fragmentary perspective view of the system showing a transport vehicle, with an optional second mast structure shown in phantom.

Each storage bin 31 includes a rectangular shaped load receiving end 34 adjacent a respective aisle space 46 and defined by adjacent uprights 40 and longitudinal bracing 41. A pair of load support members 45 are positioned within each respective storage bin 31 and extend horizontally in a direction substantially normal to a respective load receiving end 34 (FIG. 1a). Material load units 11, positioned in respective storage bins 31, straddle respective pairs of load support members 45 and are supported thereby. An unobstructed space 47 extends into each storage bin 31 from an adjacent load receiving end 34 generally between, above and below each respective pair of load support members 45 for purposes which will be more fully set forth hereinafter.

A respective lower guide rail 50 extends along a floor surface 49 in each aisle space 46. Each floor rail 50 is secured to the floor surface 49 by base plates 51 with shims 52 thereunder and suitable fastener means such as bolts 53 extending therethrough and anchored in the floor surface 49 (FIGS. 3 and 4). Upper guide tubes 55 are attached to top cross ties 43 and extend substantially parallel to and in spaced relation above respective lower guide rails 50 in each aisle 46. Each lower guide rail 50 has respective impact bumpers 56 positioned at the ends 54 thereof. Upper guide tubes 55 also have impact bumpers (not shown) attached to the opposite ends thereof.

III. VEHICLE

The reference numeral 60 generally designates a vehicle as shown in FIG. 2 for moving the material loads 11 between the pickup and delivery stations 22 and the storage bins 31. The vehicle 60 comprises a mast 61 with upper and lower ends 62 and 63 respectively, front and rear faces 64 and 65 respectively and right and left sides 66 and 67 respectively. The mast 61 is preferably constructed of structural steel plate and rolled members with internal stiffener diaphragm plates (not shown) to provide torsional rigidity. An optional second mast 68 is shown in phantom in FIG. 2 for supporting particularly heavy material load units 11 on the vehicle 60.

A top section 70 is attached to the mast upper end 62 and includes front and rear ends 71 and 72 respectively. A base frame 75 is attached to the mast lower end 63 and comprises welded and formed structural steel plate designed for minimum flexure. The base frame 75 includes a front end 76 and a rear end 77 and is constructed integrally with the mast 61 for maximum strength and rigidity. While traversing a respective aisle 46, the vehicle 60 is guided by molded polyurethane upper guide rollers 80 attached to the mast top section 70 and engaging an upper guide tube 55. Also attached to the vehicle top section 70 are power and communications pickups 81 and 82 respectively which are of the double shoe type to minimize problems of shoe bounce and conductor corrosion. For automatic storage and retrieval systems 10 operating within freezers and coolers, a special combination of materials may be utilized in pickups 81 and 82 to eliminate corrosive problems resulting from an ammonia containing atmosphere. The function of such pickups 81 and 82 will be more fully described herein.

Carriage guide bars 85 extend outwardly from right and left sides 66 and 67 respectively of the mast 61 and are substantially flush with the mast front face 64. The carriage guide bars 85 are preferably comprised of cold finished carbon alloy steel for long life wear characteristics and are removably attached to the mast 61 by suitable fastening means such as bolts (not shown). A safety dog engagement channel 86 with a plurality of slots or apertures (not shown) punched therethrough is welded to the front face 64 of the mast 61 for purposes which will be more fully set out hereinafter.

A carriage 90 is mounted on the vehicle mast 61 for vertical movement with respect thereto and comprises a frame 91 of welded structural tubing. Guide rollers 92 are pivotally connected to the carriage frame 91 and engage carriage guide bars 85. Guide rollers 92 are preferably precision crowned face needle bearing cam rollers mounted in machine housings to absorb lateral and horizontal thrust forces without misalignment. The carriage 90 is adapted for moving material load units 11 vertically with respect to the vehicle mast 61.

A fork assembly 93 is attached to the carriage frame 91 and comprises telescoping extension members 94, preferably of high strength carbon steel, which slide with respect to each other on needle bearing cam rollers (not shown). The fork assembly 93 is movable between a retracted position with respect to the carriage 90 and an extended position to either the right (as shown in FIG. 2) or left thereof. The extension members 94 are driven by a fork drive unit 95 and are adapted for insertion into unobstructed spaces 47 between load support members 45 for storing or retrieving material load units 11 thereat.

For a storage operation wherein a material load unit 11 positioned on the carriage 90 is deposited at a respective storage bin 31, the carriage 90 is positioned adjacent thereto in a "bin high" position with the extension members 94 slightly above load support members 45. Fork drive unit 95 then biases the extension members 94 to extend outwardly and position the load within the respective storage bin 31. The carriage 90 lowers slightly to a "bin low" position where the extension members 94 are slightly below the load support members 45 and the fork drive unit 95 then retracts the extension members 94 which telescope inwardly with respect to each associated outer member 94 until centered on the carriage 60. For a retrieval operation wherein a load is removed from a respective storage bin 31 and placed upon the carriage 90, the extension members 94 extend in a bin low position into storage bin 31 and then the carriage 90 raises to the bin high position thereof, thereby lifting a material load unit 11. The extension members 94 then retract and the material load unit 11 may be transported by the vehicle 60 to another storage bin 31 or a pickup and delivery station 22. Pickup and delivery operations at the stations 22 are performed in a similar manner to such operations at the storage bins 31.

A hoisting member 100 includes first and second chains 101 and 102 respectively wrapped around first and second sprockets 109 and 110 respectively of hoist motor 99 (FIGS. 7 and 8). The first chain 101 and second chain 102 are attached to first and second main cables 103 and 104 respectively by a chain/main cable connector 106. Main cables 103 and 104 loop over respective rear main cable sheaves 113 attached to the rear 72 of the mast top section 70. Front main cable sheaves 112 are rotatably mounted on the mast top section front 71 and include a force control switch for compression loads (not shown) to detect material load units 11 which exceed a predetermined weight. One such compression load switch suitable for use with the vehicle 60 is a Dillon force control switch No. FCS-C-12 with a 5,000 pound capacity. From the front main cable sheaves 112 the main cables 103 and 104 extend downwardly adjacent the front face 64 of the mast 61 to a suitable attachment (not shown) with the carriage frame 91.

The first and second sprockets 109 and 110 respectively in combination with the hoisting member 100 comprise a vertical distance determining or measuring device 115 for measuring a vertical distance traversed by the carriage 90 with respect to the vehicle mast 61. Each revolution of the sprockets 109 and 110 thus results in the carriage 90 moving a set distance either up or down. The distances measured by the vertical distance measuring device 115 are used in a manner which will be more fully set forth hereinafter.

The hoisting member 100 utilizes both chains 101 and 102 and cables 103 and 104 in combination to take advantage of beneficial properties of each. The chains 101 and 102 are utilized because links 108 of such flexible chains are capable of providing a positive engagement with sprocket teeth 111 for transmitting hoisting force to the carriage 90. However, such chain and sprocket arrangments have the disadvantage of transmitting force in a series of jerking motions as individual chain links 108 are released by respective sprocket teeth 111. To absorb these jerking motions during hoisting operations, cables 103 and 104 are utilized which have a greater elasticity than chains 101 and 102 and thereby tend to stretch slightly to partially cushion such jerking motions. Also, teeth 111 of respective first and second sprockets 109 and 110 are staggered, as shown in FIGS. 7 and 8, so that individual chain links 108 or respective first and second chains 101 and 102 are released in an alternating sequence and jerking motions transmitted to the first and second chains 101 and 102 alternate rather than occur simultaneously, as would happen if the teeth 111 of first and second sprockets 109 and 110 were aligned. Thus, the hoisting member 100 achieves a relatively smooth hoisting of the carriage 90, while retaining the positive drive benefits associated with chains driven by sprockets.

A take-up cable 105 is looped over a take-up cable sheave 114 rotatably mounted on the vehicle top section rear 72. The take-up cable 105 is attached to the chains 101 and 102 at the chain/main cable connector 106 and the chain/takeup cable connector 107 to thereby form a continuous loop with the first and second chains 101 and 102 respectively (FIG. 2). The carriage 90 includes a positive, spring applied safety dog (not shown) which engages slots or apertures (also not shown) in safety dog engagement channel 86 in the event the hoisting member 100 breaks or goes slack.

The vehicle 60 is driven horizontally within the aisles 46 by a vehicle drive motor 120 mounted on the vehicle base rear 77 and operably connected to a drive reduction unit 121 which turns a drive wheel 125 rotatably mounted on the vehicle base rear 77. An idler wheel 126 is rotatably mounted on the front 76 of the vehicle base frame 75. The vehicle 60 is thus supported on the lower guide rail 50 by spaced drive and idler wheels 125 and 126 respectively. The drive and idler wheels 125 and 126 respectively are preferably each fabricated of a high carbon alloy steel hardened to 50–53 RC (475–500 Brinell). Each of the wheels 125 and 126 has double flanges 127 for positioning on either side of a respective lower guide rail 50. A contour tread surface 129 between the wheel flanges 127 provides generally positive, non-slip tracking with respect to the lower guide rail 50. The wheels 125 and 126 are preferably each shrink fitted to respective precision axles 130 which engage self-aligning, spherical roller type permanently lubricated bearings (not shown).

The idler wheel 126 in combination with the lower guide rail 50 comprises a horizontal distance determining or measuring device 132 for measuring a horizontal distance traversed by the vehicle 60 with respect to the lower guide rail 50. Each revolution of the idler wheel 126 thus results in the vehicle 60 moving a set distance either backwards or forwards. The distances measured by the horizontal distance measuring device 132 are used in a manner which will be more fully set forth hereinafter.

An operators cab 135 extends rearwardly from the mast rear face 65 and is generally positioned above the vehicle base rear 77 and also the hoist motor 99 and the drive motor 120. The operator's cab 135 includes a micro-processor control panel 136 and an operator switch panel 137 for controlling movement of the vehicle 60, the carriage 90 and the forks 93 in a manual mode of operation while an operator is on the vehicle 60. A power control panel 138 contains disconnects, motor overload protection, short circuit fusing, starters, relays, receptacles, transformers, power supplies and other electrical equipment (not specifically numbered) for the vehicle 60. The operator's cab 135 includes an operator's platform 139 and a safety railing 140 enclosing same. A maintenance ladder 141 extends from the operator's cab 135 to the vehicle top section rear 72.

IV. HORIZONTAL POSITIONING MECHANISM

In performing a storage or retrieval function of a material load unit 11, the vehicle 60 receives a command including an indicia designating a specific storage pickup and delivery station 22 or storage bin 31. A horizontal rough positioning mechanism 145 for the vehicle 60 is provided which includes signal generating means such as a horizontal encoder 150, for example a Datametrics Trump-Ross Encoder No. LRN-512-245DO-2A, communicating with the horizontal distance measuring device 132. As shown in FIG. 3, horizontal encoder 150 is mounted on the vehicle base face front 76 by means of a suitable mounting bracket 151 and fasteners such as bolts 155. The encoder 150 includes a rotating member 152 with a rotating shaft 153 extending therefrom. The rotating shaft 153 is connected by a coupling 154 to an output shaft 158 of a reductor 157 which also includes a reductor input shaft 159 with a pulley 160 mounted thereon. A belt 163 connects reductor input shaft pulley 160 and idler wheel pulley 164 mounted on the axle 130 of the idler wheel 126. The reductor 157 thereby functions to rotate the encoder rotating member 152 a predetermined number of degrees in response to each revolution of the idler wheel 126 representing a set horizontal distance as the vehicle 60 rolls along the lower guide rail 50. The reduction ratio of the reductor 157 is such that a maximum number of revolutions of idler wheel 126 from one end to the other of the aisle 46 will result in not more than a complete revolution of the rotating member 152 of the horizontal encoder 150. Therefore, for every position of the vehicle 60 with respect to the lower guide rail 50 there is a corresponding unique position of the rotating member 152 in the horizontal encoder 150. The reduction ratio as determined by the reductor 157, the reductor shaft pulley 160 and the idler wheel pulley 164 may be adjusted for each automatic storage and retrieval system 10 having different lengths in the aisle spaces 46 to achieve not more than a complete revolution of a respective horizontal encoder rotating member 152.

The horizontal encoder 150 generates a signal having a different value and a non-ambiguous binary numerical equivalent for each predetermined number of degrees of rotation. For example, binary values of zero to 512 might correspond to a full 360° of rotation of the rotating member 152. The reductor 157 and the pulleys 160 and 164 are then set up to rotate the rotating member 152 a predetermined total number of degrees for vehicle travel along the entire length of a respective aisle 46. For example, the encoder shaft 153 and the rotating member 152 attached thereto may be positioned at 15° at a pick-up and delivery station 22 and at 345° at the end of an aisle 46 for a total rotation of 330°. The encoder 150 signal values would thus range from 21 through 491, assuming 512 values would result from a complete 360° revolution and 470 from 330° of revolution.

In setting up a control system for horizontal rough positioning, the vehicle 60 is positioned exactly at each desired stopping position thereof at the pickup and delivery stations 22 and the storage bin columns 33. The encoder 150 signal value at each rough position zone relative to each station 22 and storage bin column 33 is then read and recorded in the memory of the automatic storage and retrieval system 10 controls. The horizontal encoder 150 signal values thus recorded comprise addresses for respective pickup and delivery stations 22 and storage bin columns 33.

The horizontal rough positioning mechanism 145 is thus compatible with the storage rack 30 having columns of storage bins 33 which are unevenly spaced. Such uneven spacing may be required because of the use of small storage bins 37 or large storage bins 38, or because such spacing is interrupted by structural members of a building (not shown) enclosing the automatic storage and retrieval system 10. The horizontal rough positioning system 145 accommodates such unequal spacing conditions because the horizontal encoder 150 will generate a signal having a unique value at each different position of its rotating member 152 whereby each position of the vehicle with respect to the lower guide rail 50 has a signal value from the horizontal encoder 150 associated therewith, regardless of the spacing between such horizontal positions.

Figure 9:
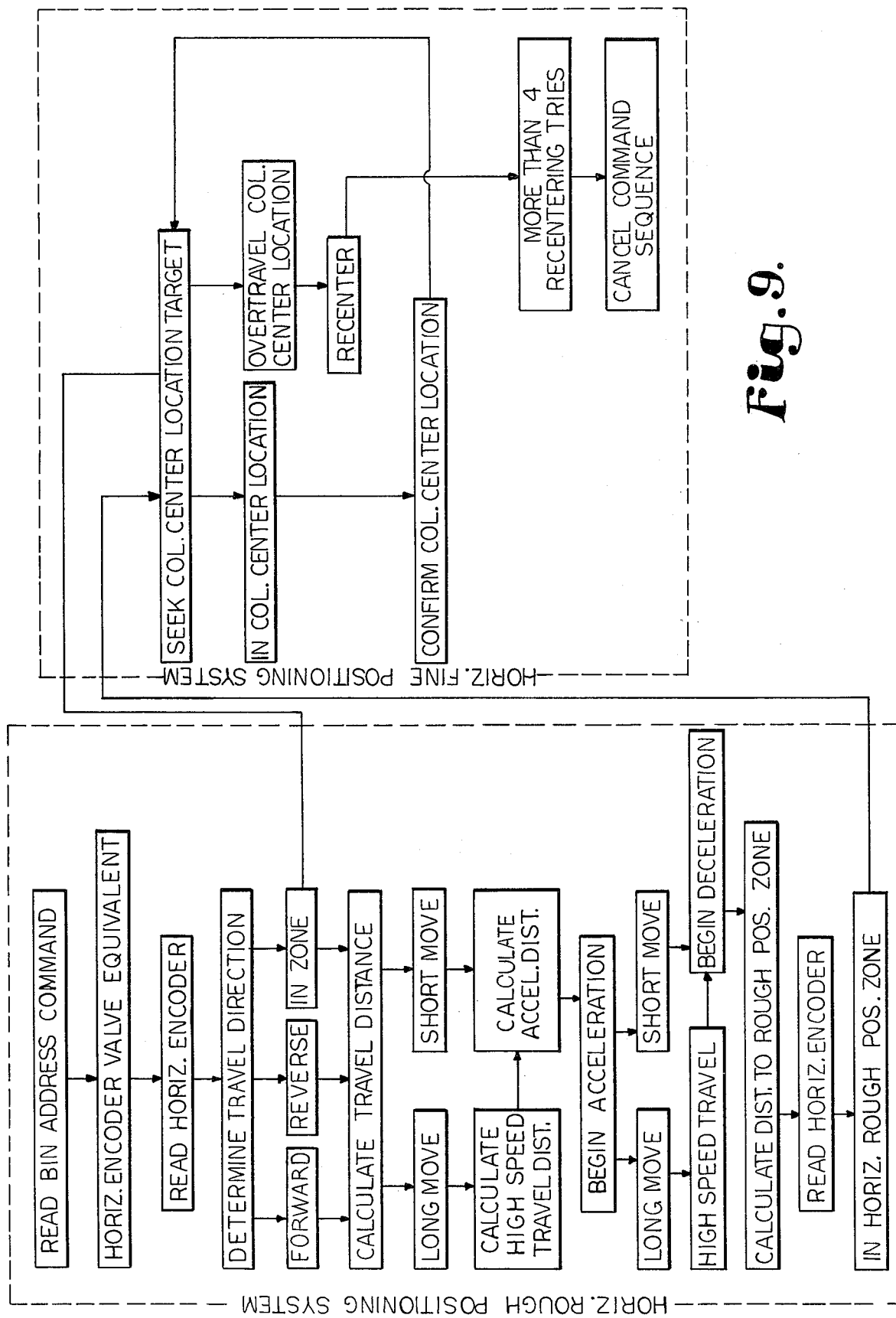
FIG. 9 is a schematic representation of a horizontal positioning system.

Using as an example a command for the vehicle 60 to move to a rough position zone adjacent a fifteenth storage bin column, the control system would first read the bin address command and use its memory as a look-up table and equate the fifteenth storage bin column with a horizontal encoder 150 signal value equivalent of 95. The signal value 95 will then be utilized in all succeeding logic functions of the control system to position the vehicle 60 within a rough position zone adjacent the fifteenth storage bin column. As shown in FIG. 9, the control system then reads the horizontal encoder 150 to determine in which rough position zone the vehicle 60 is presently positioned. Based upon a comparison of the encoder 150 signal value, thus obtained, and the equivalent encoder 150 signal value 95, the control system determines whether the travel direction for the vehicle 60 will be in a forward direction or a reverse direction. If the vehicle 60 is already in the designated rough position zone, the control system will proceed to the horizontal fine positioning sequence.

A travel distance is then determined and classified as either a long move or a short move. For a long move, the vehicle 60 will attain a relatively high speed and a distance for which such high speed travel may be maintained is calculated. For both long and short moves, an acceleration distance is calculated by means of a suitable algorithm. The control system then causes the vehicle 60 to begin acceleration and, for a long move, high speed travel is begun. Based upon readings of signal values from horizontal encoder 150, the control system will cause vehicle 60 to begin deceleration and will calculate, also by an algorithm, a remaining travel distance over which the vehicle 60 will decelerate to the designated rough position zone. A determination will then be made by the control system of whether the vehicle 60 is in the designated horizontal rough position zone by reading horizontal encoder 150.

Vehicle rough positioning zones corresponding to respective storage bin columns 33 actually comprise a respective encoder 150 signal value plus one and minus one. Thus, if the encoder 150 signal value 95 represents the address of the fifteenth storage bin column 33, the rough positioning zone therefor is defined by encoder 150 values 94 thru 96, or the equivalent of approximately 15.33 inches of vehicle travel. This range of encoder 150 signal values within which a vehicle 60 is roughly positioned accommodates for possible slight slippage of the idler wheel 126 or diameter wear related thereto with a resulting slight inaccuracy in a signal value generated by the horizontal encoder 150 with respect to the actual position of the vehicle 60.

Horizontal fine positioning of the vehicle 60 occurs within such a horizontal rough position zone as designated by a respective signal value output by horizontal encoder 150. Horizontal fine positioning is required because the rough position zones represented by each value of the encoder 150 signal are not accurate enough for storage and retrieval operations at a storage bin 31. For example, a system 10 with aisles 46 two hundred feet long would have 470 encoder values each equal to approximately 5.11 inches of horizontal travel. Fine positioning, however, must place the vehicle 60 within a vehicle fine position location one-eighth inch on either side of the centered position of the vehicle 60 with respect to the column 33 of a respective storage bin 31.

A horizontal fine positioning mechanism 165 is therefore provided which comprises an energy source means and energy sensing means such as a light source and photoelectric sensor 170 attached to the vehicle base front 76 by means of a mounting bracket 171, as shown in FIGS. 5 and 6. The mounting bracket 171 has a plurality of slots 172 therethrough for receiving suitable fastening means such as bolts 173 to allow sliding adjustment thereof with respect to the vehicle base frame 75.

Targets 175 are positioned adjacent the horizontal path of the vehicle 60 and in spaced relationship corresponding to the spacing of the storage bin columns 33. Each target 175 has an edge 176 coated with a light reflective material. The targets 175 are attached to a target rail 177 by suitable fastener means such as bolts 178. The target rail 177 is positioned adjacent and substantially parallel to the path of movement of the vehicle 60. Target rail supports 179 are attached to the floor surface 49 and the target rail 177 by suitable fastener means such as bolts 180. Slots 181 are provided in the target rail supports 179 for lateral adjustment thereof with respect to the path of movement of the vehicle 60.

Referring to the schematic diagram in FIG. 9, with the vehicle 60 in a respective rough position zone, the control means therefor will begin seeking a respective column center location target 175. When the light source and photoelectric sensor 170 is directly opposite the target 175, a light beam 183, as shown in phantom in FIGS. 5 and 6, strikes the target reflective edge 126 and is reflected to actuate photoelectric sensor 170 to emit an electrical signal. The control system then applies vehicle brakes (not shown) to stop the vehicle 60 at the column center location and then confirms its position at the column center location. If the vehicle 60 should over-travel the column center location, a recentering procedure will be initiated whereby the vehicle 60 will reverse its direction of travel, and again seek the column center location target 175. If unable to position the vehicle 60 at its column center location after four recentering procedures, the control system will cancel the command sequence. Until the vehicle 60 is within the respective rough position zone, all other targets 175 are ignored.

V. VERTICAL POSITIONING MECHANISM

A vertical rough positioning mechanism 185 for carriage 90 is provided which is similar to the horizontal rough positioning mechanism 145 and includes signal generating means such as a vertical encoder 190 communicating with the vertical distance measuring device 115 and attached to the vehicle base rear 77 by means of mounting brackets 191 with suitable fastening means such as screws 192, as shown in FIGS. 7 and 8. The vertical encoder 190 is preferably a similar model to the horizontal encoder 150 and includes a rotatable member 195 therein driven by encoder input shaft 193. The shaft 193 is operably connected to output shaft 198 of a reductor 197 by means of a coupling 914. Reductor input shaft 199 has a pulley 200 thereon for receiving a belt 203 which is also connected with a pulley 204 mounted on first sprocket 109. The rotatable member 195 of vertical encoder 190 is thus driven by the rotation of the sprockets 109 and 110 which drive the chains 101 and 102 for hoisting the carriage 90. As with the horizontal rough positioning mechanism 145, the rotatable member 195 of vertical encoder 190 rotates not more than a complete revolution in response to a maximum number of revolutions of the sprockets 109 and 110 as the carriage 90 travels between its extreme positions. For example, with a vertical encoder 190 generating a signal having binary values of zero to 512 for a full 360° of the rotating member 195 rotation, 75 feet of total vertical travel of the carriage 90 might equal 470 encoder values each representing approximately 1.9 inches of carriage travel and rotation of 330° by vertical encoder rotating member 195.

In setting up the vertical rough positioning mechanism 185, the carriage 90 is positioned on the vehicle mast 91 at each carriage rough position zone corresponding to a respective storage bin row 32. The signal value of vertical encoder 190 at each such vertical rough position zone is then read and recorded in the memory of the automatic storage and retrieval system 10 control system. The horizontal encoder 190 values thus recorded comprise addresses for respective pickup and delivery stations 22 and storage bin rows 32.

Figure 10:
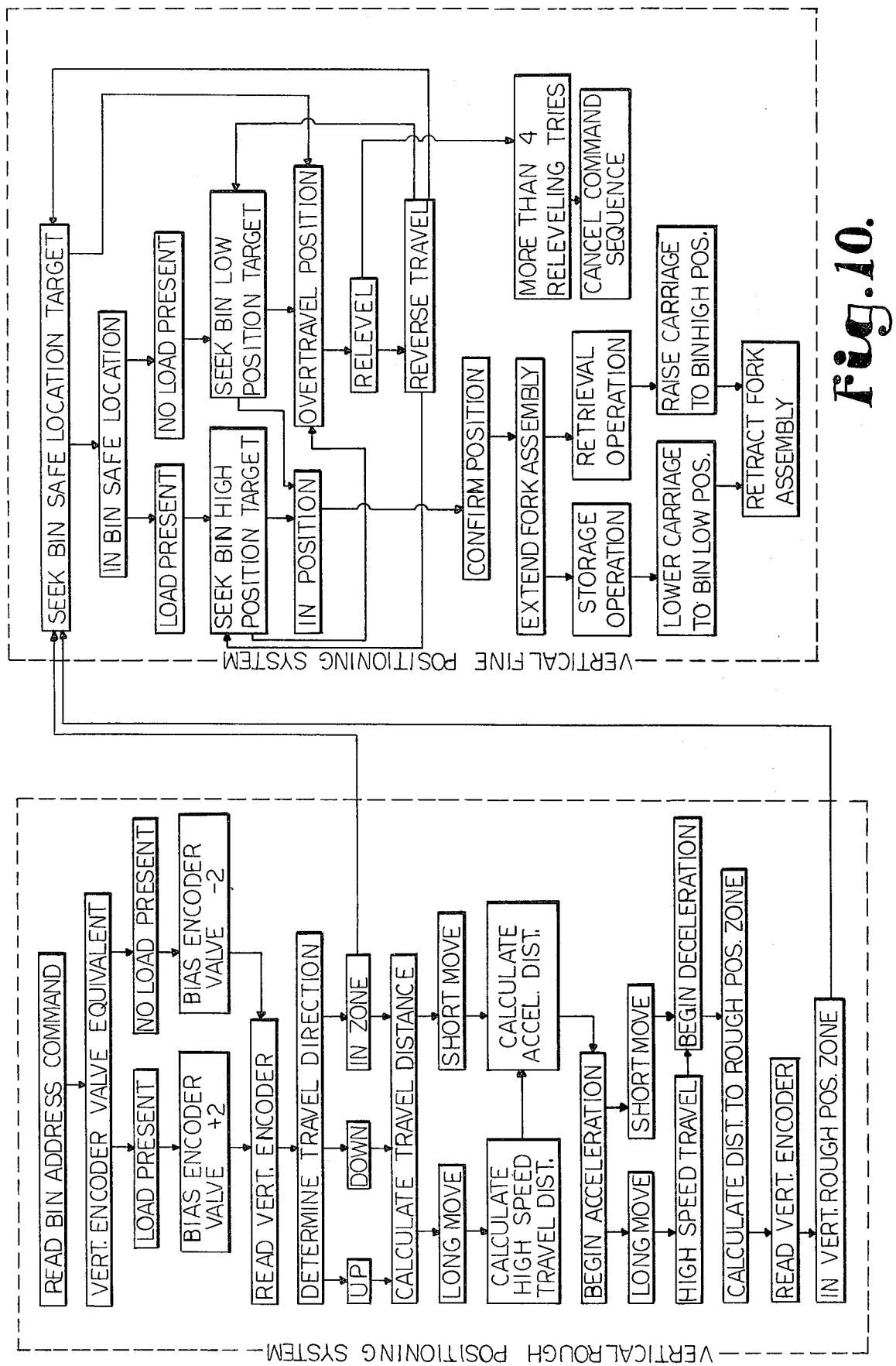
FIG. 10 is schematic representation of a vertical positioning system.

The rough position zones for the carriage 90 must include both bin high and bin low positions therein. Therefore, each rough positioning zone is defined as the respective signal value of the vertical encoder 190 designating a respective row plus two for bin high and minus two for bin low. Thus in the vertical rough positioning sequence as shown in FIG. 10, the control system determines whether a material load unit 11 is present on the carriage 90. If a material load unit 11 is present, a storage operation is thus indicated and the vertical encoder 190 value is biased by plus two to position the carriage 90 at a bin high position. If the control system detects that the carriage 90 is empty, a retrieval operation is thereby designated and the vertical encoder 190 signal value will be biased by minus two to roughly position the carriage 90 in the bin low position thereof. Otherwise, the vertical rough positioning mechanism 185 as shown schematically in FIG. 10 is virtually the same as the horizontal rough positioning mechanism 165, schematically shown in FIG. 9.

As with the horizontal rough positioning mechanism 165, the vertical rough positioning mechanism 185 is similarly well adapted to accommodate rows 32 of storage bins 31 having uneven spacing therebetween because a different signal value is generated at each position of the rotating member 195 of the vertical encoder 190 associated with a respective position of the carriage 90.

A bin safe location includes both bin high and bin low carriage 90 positions with respective to a storage bin row 32 and represents the carriage 90 position within which it may move up or down with the carriage fork assembly 93 in the extended position thereof in a respective unobstructed space 47. Within this bin safe location, a material load 11 may thus be deposited upon load support members 45 by positioning the carriage 90 in the bin high position thereof at a respective storage bin 31, extending the fork assembly 93 into the unobstructed space 47, lowering to the respective bin low position thereof and withdrawing the fork assembly 93, thus leaving a material load unit 11 within the storage bin 31 supported by the load support members 45. To retrieve a material load unit 11, the carriage 90 is positioned in the bin low location thereof, the fork assembly 93 is extended into the unobstructed space 47, the carriage 90 raises to the bin high position thereof and the fork assembly 93 retracts with the material load unit 11 thereon.

A bin safe location for the carriage 90 is determined by a first energy source means and energy sensing means, for example, a first photoelectric sensor 210 including a light source directed towards the mast right side 66 and attached to a mounting bracket 211 extending from the carriage frame 91, as shown in FIG. 2. A plurality of first or bin safe location targets 213 comprise a vertical, elongated strip of light reflective material attched to the right side 66 of the vehicle mast 61 in spaced relation corresponding to the spaced relation of the storage bin rows 32. Thus, when the first photoelectric sensor 210 is adjacent to the first target 213 and receives a reflected light beam from the light source thereof, an electrical signal will be generated thereby designating that the carriage 90 is within respective bin safe location for vertical movement with the fork assembly 93 extended.

Fine positioning of the carriage 90 in a bin high location occurs within a vertical rough position zone designated by a respective encoder 190 value bised by plus 2 and within a respective bin safe location. A second or bin high energy source means and energy sensing means, such as a second light source and photoelectric sensor 215, is attached to mounting bracket 211. As shown in FIG. 2, a plurality of second or bin high light reflective targets 216 are attached to the right side 66 of the vehicle mast 61 in spaced relation corresponding to the spaced relation of the storage bin rows 32. A third or bin low energy source means and energy sensing means is shown as a third light source and photoelectric sensor 218 attached to mounting bracket 211 and functions in a similar manner to the first and second light sources and photoelectric sensors 210 and 215 respectively in detecting third or bin low light reflective targets 219 also attached to the right side 66 of the vehicle mast 61. The first, second and third light sources and photoelectric sensors 210, 215 and 218 each project light in a collimated beam therefrom and selectively receive reflected light along the beam from a respective target 213, 216 or 219.

With the carriage 90 positioned in a designated vertical rough position zone, the control system will begin seeking the bin safe location target, as shown in FIG. 10. When positioned in the respective bin safe location, a respective bin high position target 216 will be sought, if a material load unit 11 is present on the carriage 90 and a storage operation is thereby indicated. For a retrieval operation where the carriage 90 is empty, the control system will seek a respective third or bin low position target 219. When the respective target 216 or 219 is detected, the control system will actuate carriage brakes (not shown) to stop the carriage 90 on the vehicle mast 61 and confirm the position of the carriage 90 with respect thereto. The fork assembly 93 is then extended into unobstructed space 46 associated with the respective storage bin 31. For a storage operation, the carriage 90 is then lowered to a bin low position, thereby leaving the material load unit 11 supported on the load support members 45. For a retrieval operation, the carriage 90 raises to a respective bin high position thereby picking up a material load unit 11. The fork assembly 93 may then be retracted and the vehicle 60 is then ready for its next sequential operation.

The vertical fine positioning mechanism 220 provides a releveling procedure if a respective bin high or bin low position is over-travelled. The carriage hoist motor 99 reverses the direction of carriage travel with respect to the vehicle mast 61 and the control system again seeks a respective first, second, or third target 213, 216, or 219 respectively. After more than four releveling tries, the command sequence will be cancelled.

VI. CONTROL SYSTEM

The control means or system may include various control devices such as the following described micro-computer 229 which is utilized for control and operation of the vehicles 60 in the automatic storage retrieval system 10. The micro-computer 229 includes a host process computer 230 linked to a standard remote console unit 231 along with associated transmission cable and other conventional hardware. Storage and retrieval commands are input by means of a CRT keyboard console 232. The micro-computer 229 is adapted for receiving input data for addressing, storage or retrieval functions and for providing output data of equipment status. Functions of logic, sequencing, timing, diagnostics and communications between equipment are incorporated into the control functions of the micro-computer 229. The micro-computer 229 is adapted for tying to other computer systems, for example, the main computer in a manufacturing facility, for providing inventory functions, order processing and data processing.

From the onboard micro-processor control 136 and the operator switch panel 137 in the operator's cab 135, the vehicle 60 may be operated in a hand (maintenance) mode, a manual mode with sequencing and interlocking done by the computer system, a semi-automatic mode with the operator merely addressing the vehicle 60 and an automatic mode wherein the vehicle 60 is directed from the remote console 232. From the remote console 232 the vehicle 60 may be operated in either a semi-automatic mode wherein the vehicle 60 receives operating commands from the remote keyboard 232 or in an automatic mode wherein instructions are provided by the host process computer 230.

Three power bus bars 235 provide electrical power for the vehicle 60 and extend over respective aisles 46, as shown in FIGS. 1 and 2. Two communication bus bars 236 are similarly positioned for each respective vehicle 60. The power and communication bus bars 235 and 236 are each slidably engaged by a respective pickup collector 81 mounted on the vehicle top sections 70. A carriage power and communication cable 238 is attached to the right side 66 of the vehicle mast 61 and to the carriage frame 91.

The control system also preferably includes a reset switch 240 for correcting errors in the horizontal encoder 150 signal value with respect to the vehicle 60 actual position due to possible idler wheel 126 slippage or wear. Because such error could be cumulative (either plus or minus), the horizontal encoder 150 is reset by placing the rotating member 152 in a predetermined position when the vehicle 60 is in a predetermined location, for example at a respective pickup and delivery station 22. In this position the reset switch 240 (FIGS. 3 and 4) engages a reset protrusion 245 extending from the floor surface 49. A slip clutch mechanism (not shown) is thereby actuated and the horizontal encoder rotating member 152 is reset to its predetermined position. Thus, each time the vehicle 60 is positioned at a respective pickup and discharge station 22, the horizontal encoder 150 will be reset to reduce possible error. Slippage and wear are generally not a problem with respect to the hoist mechanism 100 for carriage 90 and the vertical encoder 190 because the engagement of chains 101 and 102 with sprockets 109 and 110 is relatively constant and positive. However, such a reset mechanism could be provided for the vertical encoder 190 if required.

A vehicle slowdown switch 247 is also attached to the mounting bracket 241 and includes an arm 243 with a roller 244 attached thereto. Upon engagement with a vehicle slowdown and stop protrusion 248 mounted on the floor surface 49, the slowdown switch 247 will actuate the control system to slow the vehicle 60 from a high speed rate of travel to prevent over-running the end of a respective aisle 46. A stop switch 250 likewise is attached to the mounting bracket 241 and has an arm 243 with a roller 244 for engaging the vehicle slowdown and stop protrusion 248 at the end of a respective aisle 46. The stop switch 250 serves as a backup safety device for causing the control system to apply brakes (not shown) to stop the vehicle 60 at the end of a respective aisle 46.

The control system also includes a number of variable data features which are utilized in a checking function of the operation thereof. The variable data are programmed into the control system's memory as a "lookup" table. In performing a specific storage or retrieval operation, the control system must first make a determination of whether or not to look at and utilize a specific variable data sequence and program. The control system will therefore look up variable data as required only when a material load unit 11 is to be stored or retrieved. The variable functions are not utilized during horizontal travel of the vehicle 60 or vertical travel of the carriage 90 and are not used for positioning functions. By comparing data regarding specific storage bins 31 with data pertaining to a specific storage or retrieval operation, an improper cycle will thereby be terminated before the material load unit 11 or the automatic storage and retrieval system 10 can be damaged. Variable data functions which are actuated by switches (not shown) attached to the vehicle 60 include the following: detection of a particular storage bin 31 with a material load unit 11 therein; center and extended positions of the fork assembly 93; detection of broken or slack chains 101 and 102 or cables 103 and 104; presence of a material load unit 11 on the carriage 90; weight of a material load unit 11 on the carriage 90; and interference with movement of the vehicle 60, the carriage 90 or the fork assembly 93. Light sources and photoelectric sensors (not shown) are utilized for the following variable data functions: detecting a material load unit 11 out of position on the carriage 90; determining dimensions of a material load unit 11 on the fork 93; detecting the presence of a material load unit 11 on the fork 93 and determining the position of a material load unit 11 on the fork 93.

A method is provided for positioning a vehicle at a respective vertical column of storage bins containing a predetermined storage bin and positioning a carriage movably mounted on the vehicle at a respective horizontal row of storage bins containing the predetermined storage bin which comprises: motivating the vehicle to move between a first vehicle rough position zone spaced from the respective column and a second vehicle rough position zone including a fine position location of the vehicle near the respective column; motivating the vehicle to move within the second zone to the vehicle fine position location; motivating the carriage to move with respect to the vehicle between a first carriage rough position zone spaced from the respective row and a second vehicle rough position zone including a fine position location of the vehicle at the respective row; motivating the carriage to move within the second carriage rough position zone to the carriage fine position location; selectively motivating the carriage to move within the fine position location to a high position with respect to the predetermined storage bin; and selectively motivating the carriage to move within the carriage fine position location to a low position with respect to the predetermined storage bin.

It is to be understood that while certain forms of the present invention have been illustrated and described herein, it is not to be limited to these specific forms or arrangement of parts herein described and shown.

What is claimed and desired to be secured by Letters Patent is:

1. A system for positioning a carriage movably mounted on a vehicle at a predetermined storage bin in one of a bin high position and a bin low position, which comprises:
   (a) energy source means and energy sensing means mounted on one of said carriage and said vehicle;
   (b) a discrete energy reflective bin high target mounted on the other of said carriage and said vehicle;

(c) a discrete energy reflective bin low target mounted on said other of said carriage and said vehicle;
(d) a discrete energy reflective bin safe target mounted on said other of said carriage and said vehicle;
(e) said carriage having a laterally extendable fork;
(f) said energy sensing means being adapted to receive energy from said energy source means reflected by said targets;
(g) control means operably connected to said energy sensing means for causing said carriage to move to one of said bin high and said bin low positions and for stopping said carriage in one of said bin high and said bin low positions at said predetermined storage bin upon said energy sensing means being actuated by energy reflected from a respective one of said bin high and said bin low targets;
(h) said control means preventing vertical movement of said carriage with said fork thereof laterally extended except when said energy sensing means receives energy from said energy source reflected from said bin safe target.

2. The system according to claim 1 which includes:
(a) said bin safe target having an upper portion and a lower portion;
(b) said bin high target being mounted adjacent said bin safe target upper portion; and
(c) said bin low target being mounted adjacent said bin safe target lower portion.

3. The system according to claim 1 which includes:
(a) said carriage positioning system comprising a fine positioning system; and
(b) a carriage rough positioning system including distance measuring means for determining a distance traveled by said carriage from a start address to one of a bin high rough position zone including said bin high position and a bin low rough position zone including said bin low position.

4. The system according to claim 3 which includes:
(a) said distance measuring means comprising an encoder operably connected to said carriage and to said control means.

5. A system for fine positioning a carriage movably mounted on a vehicle at a predetermined one of a plurality of storage bins in one of a bin high position and a bin low position, which comprises:
(a) a light source mounted on said carriage;
(b) a bin high photoelectric sensor mounted on said carriage;
(c) a bin low photoelectric sensor mounted on said carriage;
(d) a bin safe photoelectric sensor mounted on said carriage;
(e) a plurality of discrete light reflective bin high targets mounted on said vehicle adjacent a path of movement of said bin high photoelectric sensor;
(f) a plurality of discrete light reflective bin low targets mounted on said vehicle adjacent a path of movement of said bin low photoelectric sensor;
(g) a plurality of discrete light reflective bin safe targets mounted on said vehicle adjacent a path of movement of said bin safe photoelectric sensor;
(h) said carriage having a laterally extendable fork; and
(i) control means operably connected to said photoelectric sensors for causing said carriage to move to one of said bin high and said bin low positions and for stopping said carriage in one of said bin high and said bin low positions at said predetermined storage bin;
(j) said control means preventing vertical movement of said carriage with said fork thereof laterally extended except when said bin safe photoelectric sensor receives light reflected from one of said bin safe targets.

6. In an automated warehouse having a storage rack with a plurality of storage bins arranged in vertical columns and horizontal rows, a system for positioning a carriage vertically movably mounted on a horizontally movable vehicle at a predetermined storage bin in one of a bin high position and a bin low position, which comprises:
(a) a horizontal positioning system including:
  (1) a light source mounted on said vehicle;
  (2) a photoelectric sensor mounted on said vehicle; and
  (3) a plurality of light reflective targets mounted adjacent a path of movement of said photoelectric sensor mounted on said vehicle;
(b) a vertical positioning system including:
  (1) a light source mounted on said carriage;
  (2) a bin high photoelectric sensor mounted on said carriage;
  (3) a bin low photoelectric sensor mounted on said carriage;
  (4) a bin safe photoelectric sensor mounted on said carriage;
  (5) a plurality of discrete light reflective bin high targets mounted on said vehicle adjacent a path of movement of said bin high photoelectric sensor;
  (6) a plurality of discrete light reflective bin low targets mounted on said vehicle adjacent a path of movement of said bin low photoelectric sensor; and
  (7) a plurality of discrete light reflective bin safe targets mounted on said vehicle adjacent a path of movement of said bin safe photoelectric sensor;
(c) said carriage having a lateraly extendable fork; and
(d) control means operably connected to said photoelectric sensors for causing said vehicle to move to a horizontal position adjacent a respective column containing said predetermined storage bin and for causing said carriage to move to one of said bin high and said bin low positions at said predetermined storage bin;
(e) said control means preventing vertical movement of said carriage with said fork thereof laterally extended except when said bin safe photoelectric sensor receives light reflected from one of said bin safe targets.

7. A positioning method whereby a vehicle located at a start address is positioned at a fine position location within a rough position zone including a destination address, which comprises the steps of:
(a) generating a signal having a first non-ambiguous binary value corresponding to said start address;
(b) communicating said signal having said first value to control means for said vehicle;
(c) receiving in said control means a second nonambiguous binary value corresponding to said destination address;

(d) comparing in said control means said first and second values;
(e) expanding said second value to a range of nonambiguous binary values corresponding to said rough position zone;
(f) causing with said control means said vehicle to travel from said start address to said rough position zone;
(g) generating a signal having a value within said range;
(h) communicating said signal having said value within said range to said control means whereby said vehicle is designated as being located in said rough position zone;
(i) projecting energy from energy source means mounted on said vehicle;
(j) reflecting said energy with an energy reflective target when said vehicle is in said fine position location;
(k) sensing said reflected energy with energy sensing means mounted on said vehicle;
(l) generating with said energy sensing means a signal in response to sensing said reflected energy;
(m) communicating said signal from said energy sensing means to said control means; and
(n) causing with said control means said vehicle to stop at said fine position location.

8. A positioning method whereby a carriage located at a start address is positioned at a fine position location in one of a bin high rough position zone and a bin low rough position zone at a destination address, which comprises the steps of:
(a) generating a signal having a first non-ambiguous binary value corresponding to said start address;
(b) communicating said signal having said first value to control means for said carriage;
(c) receiving in said control means a second non-ambiguous binary value corresponding to said destination address;
(d) comparing in said control means said first and second values;
(e) determining if a load is present on said carriage;
(f) biasing said second value to a bin high non-ambiguous binary value corresponding to said bin high rough position zone if a load is present on said carriage;
(g) biasing said second value to a bin low non-ambiguous binary value corresponding to said bin low rough position zone if a load is not present on said carriage;
(h) causing with said control means said carriage to move to one of said bin high and said bin low rough position zones to which said biased second value corresponds;
(i) generating a signal having said biased second value;
(j) communicating said signal having said biased second value to said control means whereby said vehicle is designated as being located in said one of said bin high and said bin low rough position zones;
(k) projecting energy from energy source means mounted on said carriage;
(l) reflecting said energy when said carriage is in said fine position location;
(m) sensing said energy with energy sensing means mounted on said carriage;
(n) generating with said energy sensing means a signal in response to sensing said reflected energy;
(o) communicating said signal from said energy sensing means to said control means; and
(p) causing with said control means said carriage to stop at said fine position location.

9. A positioning method whereby a vehicle located at a horizontal start address is positioned at a horizontal fine position location within a horizontal rough position zone including a horizontal destination address and a carriage vertically movably mounted on the vehicle and located at a vertical start address is positioned at a vertical fine position location within one of a bin high rough position zone and a bin low rough position zone at a vertical destination address, which comprises the steps of:
(a) generating a signal having a first non-ambiguous binary value corresponding to said horizontal start address;
(b) communicating said signal having said first value to control means for said vehicle;
(c) receiving in said control means a second non-ambiguous binary value corresponding to said horizontal destination address;
(d) comparing in said control means said first and second values;
(e) expanding said second value to a range of non-ambiguous binary values corresponding to said horizontal rough position zone;
(f) causing with said control means said vehicle to travel from said horizontal start address to said horizontal rough position zone;
(g) generating a signal having a value within said range;
(h) communicating said signal having said value within said range to said control means whereby said vehicle is designated as being located in said horizontal rough position zone;
(i) projecting energy from energy source means mounted on said vehicle;
(j) reflecting said energy with an energy reflective target when said vehicle is in said horizontal fine position location;
(k) sensing said reflected energy with energy sensing means mounted on said vehicle;
(l) generating with said energy sensing means a signal in response to sensing said reflected energy;
(m) communicating said signal from said energy sensing means to said control means;
(n) causing with said control means said vehicle to stop at said horizontal fine position location;
(o) generating a signal having a first non-ambiguous binary value corresponding to said vertical start address;
(p) communicating said signal having said first value to control means for said carriage;
(q) receiving in said control means a second non-ambiguous binary value corresponding to said vertical destination address;
(r) comparing in said control means said first and second values;
(s) determining if a load is present on said carriage;
(t) biasing said second value to a bin high non-ambiguous binary value corresponding to said bin high rough position zone if a load is present on said carriage;
(u) biasing said second value to a bin low non-ambiguous binary value corresponding to said bin low rough position zone if a load is not present on said carriage;

(v) causing with said control means said carriage to move to one of said bin high and bin low rough position zones to which said biased second value corresponds;

(w) generating a signal having said biased second value;

(x) communicating said signal having said biased second value to said control means whereby said vehicle is designated as being located in said one of said bin high and said bin low rough position zones;

(y) projecting energy from energy source means mounted on said carriage;

(z) reflecting said energy when said carriage is in said fine position location;

(aa) sensing said energy with said energy sensing means mounted on said carriage;

(bb) generating with said energy sensing means a signal in response to sensing said reflected energy;

(cc) communicating said signal from said energy sensing means to said control means; and (dd) causing with said control means said carriage to stop at said fine position location.

* * * * *